US012674879B2

(12) United States Patent
Enami et al.

(10) Patent No.: US 12,674,879 B2
(45) Date of Patent: Jul. 7, 2026

(54) RADAR DEVICE

(71) Applicants: DENSO CORPORATION, Kariya-city (JP); MIRISE Technologies Corporation, Nisshin (JP)

(72) Inventors: Tatsuya Enami, Nisshin (JP); Yoshie Kobayashi, Nisshin (JP); Yukou Murase, Nisshin (JP)

(73) Assignees: DENSO CORPORATION, Kariya-city (JP); MIRISE Technology Corporation, Nisshin (JP)

( * ) Notice: Subject to any disclaimer, the term of this patent is extended or adjusted under 35 U.S.C. 154(b) by 334 days.

(21) Appl. No.: 18/456,056

(22) Filed: Aug. 25, 2023

(65) Prior Publication Data

US 2024/0210549 A1 Jun. 27, 2024

(30) Foreign Application Priority Data

Aug. 29, 2022 (JP) ................................. 2022-135861

(51) Int. Cl.
*G01S 13/32* (2006.01)
*G01S 7/35* (2006.01)
(Continued)

(52) U.S. Cl.
CPC ............ *G01S 13/325* (2013.01); *G01S 7/354* (2013.01); *G01S 13/36* (2013.01); *G01S 13/931* (2013.01)

(58) Field of Classification Search
CPC ........ G01S 13/325; G01S 7/354; G01S 13/36; G01S 13/931
(Continued)

(56) References Cited

U.S. PATENT DOCUMENTS

2018/0259632 A1* 9/2018 Kishigami .............. G01S 7/023
2020/0011983 A1* 1/2020 Kageme ................ G01S 13/325
(Continued)

FOREIGN PATENT DOCUMENTS

CN 110133610 A * 8/2019 ............. G01S 13/58
GB 2568076 A * 5/2019 ............. G01S 7/292

OTHER PUBLICATIONS

Norton et al. "On the Hamming Distance of Linear Codes Over a Finite Chain Ring," IEEE Transactions on Information Theory, vol. 46, No. 3, May 2000, p. 1060-1067 (Year: 2000).*
(Continued)

*Primary Examiner* — Samarina Makhdoom
(74) *Attorney, Agent, or Firm* — Posz Law Group, PLC

(57) ABSTRACT

A radar device includes a transmitting antenna unit, a modulator, a receiving antenna unit, a receiver, and a processor. The transmitting antenna unit includes transmitting antennas. The modulator generates transmission signals respectively provided to the transmitting antennas by executing phase-shift keying through diverging the common signal into diverged signals having the number being equal to the number of the transmitting antennas and rotating respective phases of the diverged signals. The receiving antenna unit includes at least one receiving antenna. The receiver generates a received code of at least one received signal. The received code is acquired by encoding an appearance pattern of a peak of at least one received signal on a Doppler frequency axis. The processor generates information related to an object, according to the received code generated by the receiver. The modulator executes the phase-shift keying by using a linear block code as an assigned code.

23 Claims, 9 Drawing Sheets

(51) Int. Cl.
    *G01S 13/36*       (2006.01)
    *G01S 13/931*     (2020.01)

(58) Field of Classification Search
    USPC ........................................................ 342/102
    See application file for complete search history.

(56)              References Cited

U.S. PATENT DOCUMENTS

| | | | |
|---|---|---|---|
| 2020/0191939 A1* | 6/2020 | Wu ........................ | G01S 7/354 |
| 2020/0209380 A1 | 7/2020 | Takayama | |
| 2021/0132187 A1 | 5/2021 | Cottron et al. | |
| 2022/0171049 A1 | 6/2022 | Wu et al. | |
| 2023/0051791 A1 | 2/2023 | Sturm et al. | |

OTHER PUBLICATIONS

Bliss D.W. et al, "GMTI MIMO Radar", WD&D Conference, 2009, pp. 118-122.
Sun, Yuliang et al., "Enhancing Unambiguous Velocity in Doppler-Division Multiplexing MIMO Radar", 1 Proceedings of the 18th European Radar Conference, Apr. 2022, DOI: 10.23919/EuRAD50154.2022.9784545.

* cited by examiner

ASSIGNED CODE = 「11000」

RECEIVED CODE =

「1」 「1」 「0」 「0」 「0」=「11000」

−Vmax/2　　　　　　　DC　　　　　+Vmax/2

FIG. 5

IN CASE OF NUMBER OF PHASES = P AND NUMBER OF OBJECTS = 2

RADAR DEVICE

CROSS REFERENCE TO RELATED APPLICATION

This application is based on Japanese Patent Application No. 2022-135861 filed on Aug. 29, 2022, the disclosure of which is incorporated herein by reference.

TECHNICAL FIELD

The present disclosure relates to a radar device.

BACKGROUND

To improve the resolution of a radar device, a Multi-Input Multi-Output (MIMO) technique for transmitting radio waves respectively from transmitting antennas may be applied. With regard to the MIMO, it is necessary to separate transmission signals from transmitting antennas in order to detect an object.

SUMMARY

The present disclosure describes a radar device that transmits radio waves from multiple antennas to detect an object, and further describes that the radar device includes a transmitting antenna unit, an oscillator, a modulator, a receiving antenna unit, and a processor.

BRIEF DESCRIPTION OF DRAWINGS

FIG. 5 illustrates the configuration of a processor and the flow of calculation according to a third embodiment.

DETAILED DESCRIPTION

Figure 1:
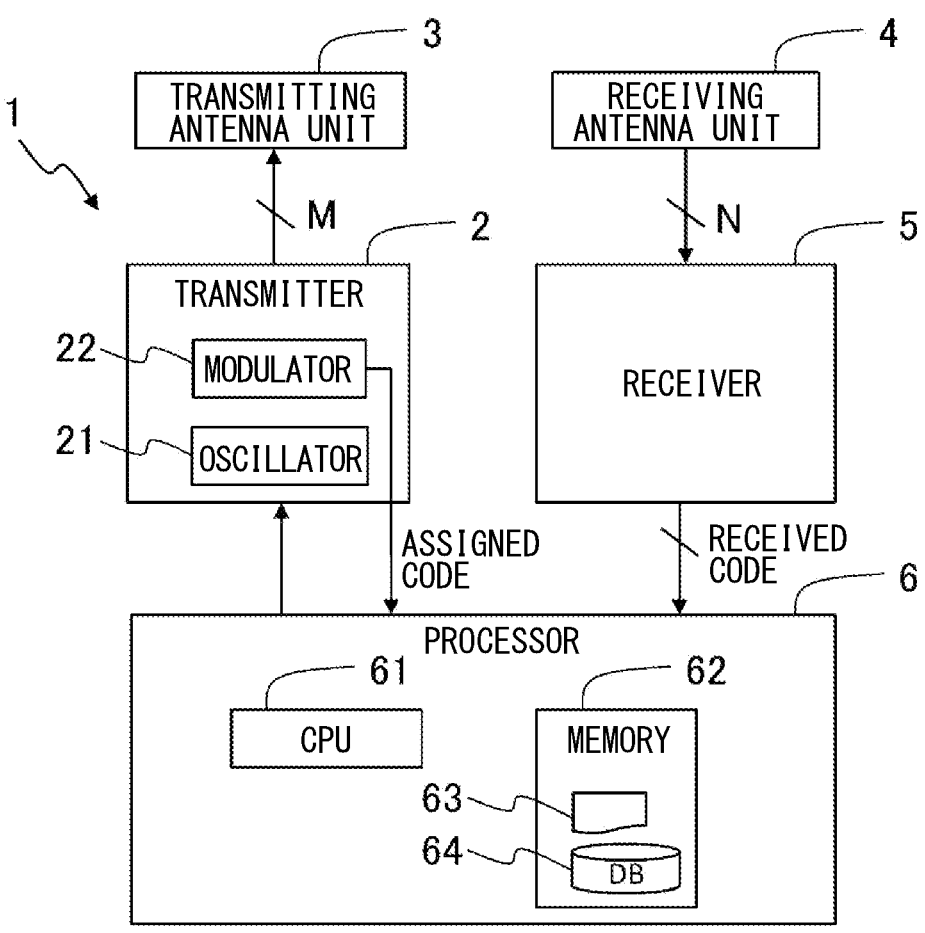
FIG. 1 schematically illustrates the configuration of a radar device according to a first embodiment.

By applying, for example, doppler division multiplexing (DDM) for a radar device, phase-shift keying is executed by adopting phase shift amount differed in each transmission antenna to separate each transmission signal as a distinct signal component on the Doppler frequency axis. For example, the accuracy of identifying the transmission signals from received signals may be improved by reducing the number of transmitting antennas relative to the number of phases for modulation.

However, according to the speed or velocity of an object, the shift of the position of the peak on the Doppler frequency, in other words, aliased noise or folded noise may occur. At this time, if the folded peak overlaps the peak of another object, the transmission signals may not be separated, and the speed or velocity of the object may not be accurately estimated or the angle measurement accuracy may decrease. Thus, information about the object may not be obtained accurately.

In this case, it is conceivable to avoid the overlapping in the presence of multiple objects by making the spacing of multiple pairs of peaks corresponding to transmission signals on the Doppler frequency to be totally different through a Golomb ruler. However, a large number of phases are required to execute phase-shift keying to form the Golomb ruler. Therefore, it may be difficult to implement practically.

According to an aspect of the present disclosure, a radar device includes a transmitting antenna unit, an oscillator, a modulator, a receiving antenna unit, a receiver and a processor. The transmitting antenna unit includes multiple transmitting antennas. The oscillator generates a common signal having a continuous wave. The modulator generates multiple transmission signals respectively provided to the multiple transmitting antennas by executing phase-shift keying. The phase-shift keying includes: diverging the common signal into multiple diverged signals having the number being equal to the number of the multiple transmitting antennas; and rotating respective phases of the multiple diverged signals by different amounts of phase rotation. The receiving antenna unit includes at least one receiving antenna. The receiver generates a received code of at least one received signal received by the receiving antenna unit. The received code is acquired by encoding an appearance pattern of a peak of at least one received signal on a Doppler frequency axis. The processor generates information related to an object that reflects a wave radiated from the transmitting antenna unit, according to the received code generated by the receiver. An assigned code is defined as a code acquired by encoding an appearance pattern of a peak that is expected to appear on the Doppler frequency axis when the object is stationary. The modulator executes the phase-shift keying adopting a linear block code as the assigned code.

Several embodiments are described below with reference to the drawings. The configurations that are substantially common in each embodiment will be described with the same reference numerals.

First Embodiment

A first embodiment will be described below. A radar device 1 shown in FIG. 1 may be adapted to a vehicle and adopted to obtain information related to various objects existing around the vehicle. The radar device 1 includes a transmitter 2, a transmitting antenna unit 3, a receiving antenna unit 4, a receiver 5, and a processor 6. The transmitting antenna unit 3 has a total of M transmitting antennas 3a1 to 3aM, as shown in an example of an antenna arrangement in FIG. 2A. Here, M is an integer being equal to 2 or more. The transmitting antennas 3a are arranged in a row along a preset arrangement direction at preset intervals.

The receiving antenna unit 4 has a total of N receiving antennas 4a1 to 4aN, as illustrated in an example of the arrangement example on a transmission side. Here, N is an integer being equal to 1 or more. When multiple receiving antennas 4a are provided, the receiving antennas 4a are arranged in a direction identical to the arrangement direction of the transmitting antennas 3a, while the multiple receiving antennas 4a are arranged at intervals different from the transmitting antennas 3a.

For example, it may be assumed that an object as a detected target exists in a direction tilted by θ with respect to a frontal direction of the transmitting antenna unit 3 and the receiving antenna unit 4. In this case, the receiving antenna 4a1 receives a signal transmitted from the transmitting antenna 3a1, a signal transmitted from the transmitting antenna 3a2, and a signal transmitted from the transmitting antenna 3aM. Similarly, each of other receiving antennas 4a also receives signals transmitted from respective transmitting antennas 3a1 to 3aM.

As a result, an imaginary array having a total of M×N receiving antennas 4a arranged at different distances from one reference receiving antenna 4a is formed. As a result, it is possible to obtain the same angular resolution as in a case of having a single transmitting antenna and a total of M×N receiving antennas.

The transmitter 2 includes an oscillator 21 and a modulator 22 as shown in FIG. 1. The oscillator 21 generates a continuous wave common signal and outputs the generated common signal to the modulator 22.

The modulator 22 diverges the common signal generated by the oscillator 21 to generate a total of M diverged signals. M is the number identical to the number of the transmitting antennas 3a. The modulator 22 sets different amounts of phase rotation respectively for the M diverged signals, and executes phase-shift keying to rotate the phase of each of the diverged signals by the amount of phase rotation set through the modulator 22. Thus, a total of M transmission signals are generated.

For example, the modulator 22 executes phase-shift keying by using a total of P phase rotation amounts. Each of the phase rotation amounts is expressed by $(\Delta\varphi)=p\times360°/P$, where: P denotes the number of phases used in the phase-shift keying and is an integer larger than M; and p=0, 1, 2, . . . P−1. Since P is larger than M, not all of the P phase rotation amounts are used when phase-shift keying is executed, but some of them are used in the phase-shift keying.

The modulator 22 executes phase-shift keying such that an assigned code is a linear cyclic block code as an example of a linear block code. The assigned code is an encoded pattern of a peak on the Doppler frequency axis that is anticipated in a case where an object existing within a measurement range is stationary. The measurement range corresponds to a transmission range of the transmitting antenna unit 3. Also, the appearance pattern of the peak is determined by phase allocation to each transmission signal. For example, when P denotes the number of phases and M denotes the number of transmitting antennas 3a, the assigned code has a code length of P bits, each of M bits included in the P bits is represented by the sign "1", and each of the remaining (P−M) bits included in the P bits is represented by the sign "0". For example, as illustrated in FIG. 2B, when the number of transmitting antennas 3a is two and the number of phases is five, a 5-bit code such as "11000" can be set as the assigned code.

The receiver 5 generates a received code acquired by encoding the appearance pattern of the peak on the Doppler frequency axis for each of the N received signals output from the respective receiving antennas 4a of the receiving antenna unit 4, and outputs the received code to the processor 6. The received code is an appearance pattern obtained from the peak detection result of the actual received signal on the Doppler frequency axis. For example, when P denotes the number of phases and M denotes the number of transmitting antennas 3a, the received code has a code length of P bits being equal to the number of phases used for phase shift keying. Each of M bits included in the P bits is represented by the sign "1"; and each of the remaining (P-M) bits is represented by the sign "0".

Figures 2A, 2B:
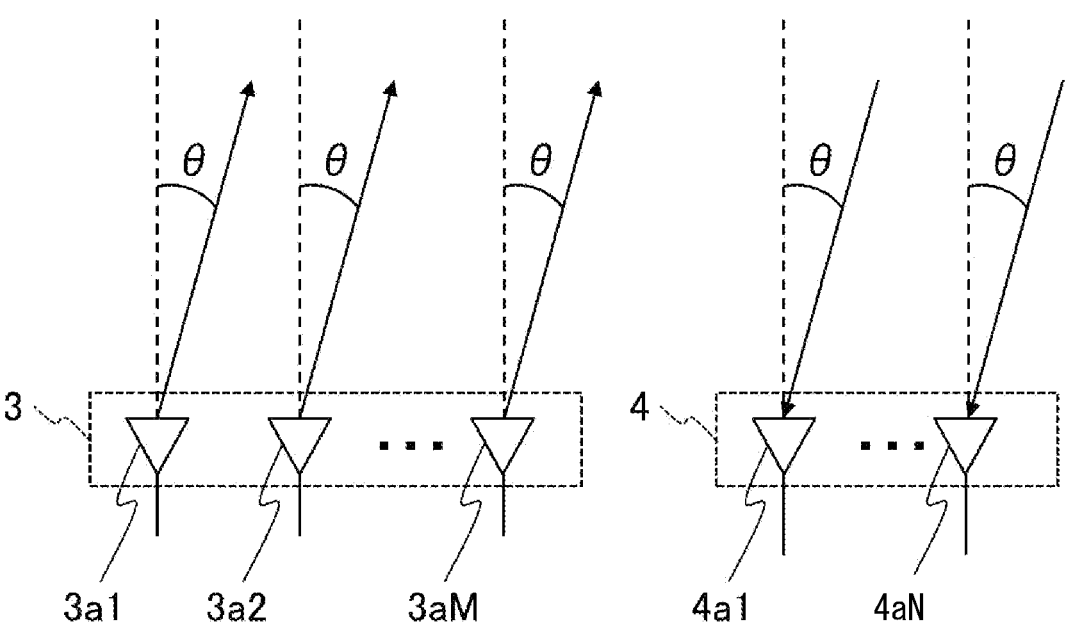
FIG. 2A illustrates an example of antenna arrangement.
FIG. 2B illustrates an example of an assigned code and a received code.

For example, as shown in FIG. 2B, when "11000" is set as the assigned code and phase-shift keying is executed, peaks are detected at M spots included in P spots acquired by dividing the Doppler observation range into P regions in a distance-velocity map in which a speed or velocity can be unambiguously identified based on the vertical axis and the horizontal axis. The vertical axis indicates the distance, and the horizontal axis indicates the Doppler frequency. Therefore, the received code received in a case of, for example, the absence of an object has a peak detected at the position of the black circle. By associating the peak position with "1" and the position without having the peak with "0", a 5-bit code "11000" is obtained as the received code. In the present disclosure, the distance-velocity map may also be referred to as a distance-speed map.

The processor 6 is a microcomputer having a CPU 61 and a memory 62 such as a RAM and a ROM. The processor 6 controls the entire radar device 1 by executing a program 63 stored in the memory 62 by the CPU 61. The processor 6 causes the modulator 22 to execute phase-shift keying in which the assigned code is a linear cyclic block code to generate the information of the object based on the cross-correlation between the assigned code and the received code. At this time, the number of phases, assigned codes, various data used for, for example, cross-correlation calculation are stored in the memory 62 as database 64.

The processor 6 may be a single microcomputer, or may include multiple microcomputers. A method of implementing the functions of the processor 6 is not limited to software, and some or all of the functions may be realized with the use of one or multiple hardware.

Next, the advantageous effects of the configuration described above will be explained. As described above, in the radar device 1 using the MIMO technique, it is necessary to separate transmission signals from transmission antennas 3a in order to detect an object. Separation of the transmission signal means specifying which one of the reflected waves transmitted from transmission antennas 3a corresponds to the received signal. In this case, for example, by making the number of transmitting antennas to be smaller than the number of phases adopted for modulation, the accuracy of identifying transmission signals from the received signals may be improved.

However, depending on the velocity or speed of an object within the measurement range, a situation in which the position of the peak shifts on the Doppler frequency, in other words, folded noise or aliased noise may occur. As a result, the folded peak of an object may overlap the peak of another object so that it may be difficult to separate the transmission signals. If the transmission signals cannot be separated, it may be difficult to accurately estimate the velocity or speed of the object, or the accuracy of angle measurement may decrease. Thus, it may be difficult to accurately obtain the information of the object.

In this case, it is conceivable to avoid the overlapping in the presence of several objects by making the spacing of pairs of peaks corresponding to transmission signals on the Doppler frequency to be totally different through the Golomb ruler. However, the Golomb ruler has a situation in which the number of required phases increases as the number of transmission signals to be multiplexed increases. For example, in a case where twelve transmission signals are multiplexed, the length of the Golomb ruler is 85. Therefore, the number of required phases must be at least 170 being double of the length of the Golomb ruler. However, it may be difficult to implement such a number of required phases in practice.

Accordingly, the implementation is simpler in the radar device 1 as described in the following, and the information of an object can be attained accurately even though multiple objects are present in, for example, a transmission range of the transmitting antenna unit 3. In other words, the radar device 1 is easy to be implemented. Even if multiple objects are present, the phase-shift keying is executed in the modulator 22 based on the assigned code that can accurately obtain information of the object.

Firstly, the following describes the conditions required for the assigned codes. For example, in a case where two objects exist within the measurement range, a folded noise is not generated at one of two objects, and the folded noise is generated at the other one of two objects. The result is obtained the a distance-velocity map. At this time, in a case where radar measurement is executed by executing phase-shift keying based on a specific assigned code, the distance-velocity map actually obtained will be a map as a result of the logical sum operation of the assigned code without folded noise and the assigned code that has cyclically shifted once. The logical sum operation is hereinafter referred to as an OR operation. In this case, in order to separate the transmission signals, the assigned code may satisfy the following conditions.

Condition 1: There are only few correspondence relation between the sign "1" and sign "1" among cyclically-shifted codes. In other words, the original code and the cyclically-shifted code are codes that should have combination of the sign "1" and the sign "0" as much as possible at the same bit position. A portion having the combination of the sign "1" and the sign "1" corresponds to the overlapping of peaks.

Condition 2: The result of the OR operation is unique. In other words, the code should have few combinations that yield the same result as the result of the OR operation.

A linear cyclic block code is considered as a code that may satisfy the above conditions. For example, if the code length is 8 bits, the linear cyclic block code uses only specific codes that have a relatively large Hamming distance from each other from a collection of 256 types of codes. At this time, the selected code becomes a codeword.

Linear cyclic block codes have the property of cyclicity such that a cyclic shift of a codeword also results in a codeword. A large Hamming distance means that there are few correspondence relations between the sign "1" and the sign "1" and between the sign "0" and the sign "0". The large Hamming distance means that there will be less overlapping of peaks on the Doppler frequency axis. Therefore, by selecting a linear cyclic block code with a relatively large Hamming distance as the assigned code, it can be expected that the number of overlapping peaks on the Doppler frequency axis can be reduced, for example, in the same way as when selecting a so-called error correction code. Therefore, the radar device 1 executes phase-shift keying using a linear cyclic block code having cyclicity as an assigned code.

At this time, when M denotes the number of transmitting antennas 3a as described above, the assigned code is a code in which each of the M bits is assigned by "1" and each of the (P−M) bits is assigned by the sign "0". For example, when the number of transmitting antennas 3a1 is 4 (in other words, M=4), 8 is selected as the number of phases (in other words, P=8) in order to obtain a linear cyclic block code in which the sign "1" exists in 4 bits. The number of phases may be appropriately selected within a range in which a modulator 22 can execute phase-shift keying.

Now, when 8 is selected as the number of phases (in other words, P=8), for example, "10001011" can be set as the code assigned to be the linear cyclic block code. "10001011" indicates that the most significant bit (MSB) in an 8-bit binary number is assigned by "1" followed by "0", and the least significant bit (LSB) is assigned by the "1".

Figure 3:
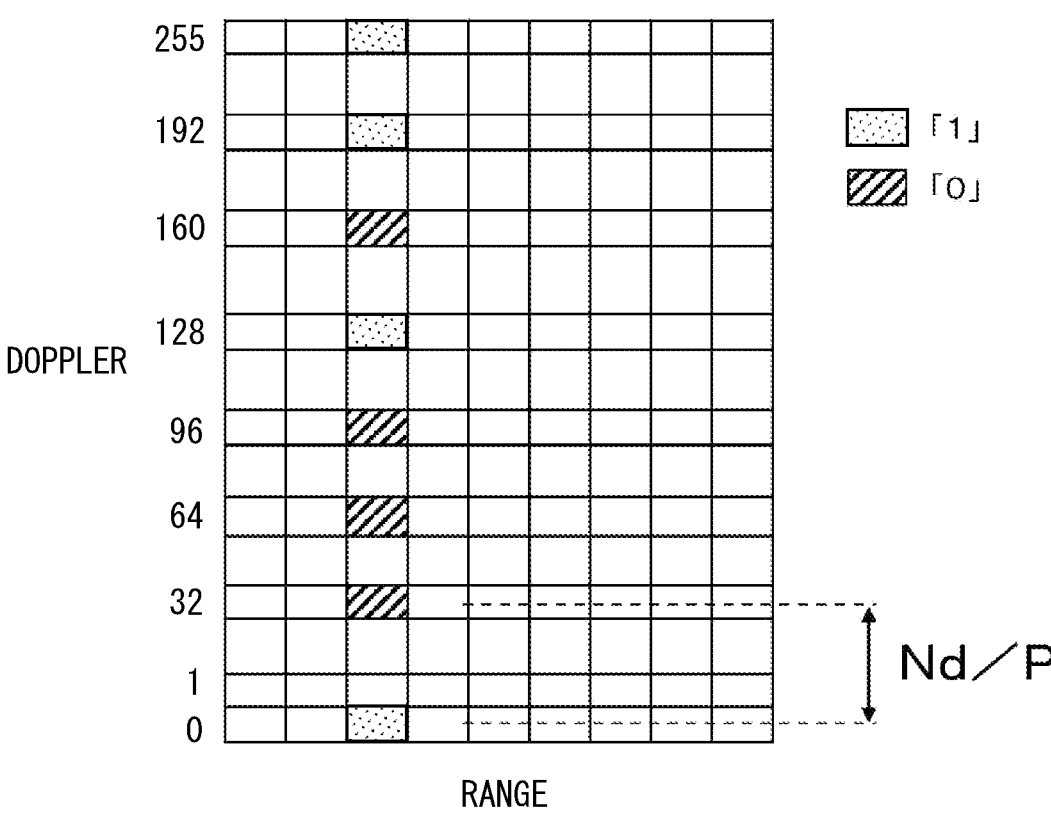
FIG. 3 schematically illustrates an example of generation of the assigned code in Doppler bin.

As shown in FIG. 3, the radar device 1 associates each transmission signal with a bin corresponding to the assigned code "1" in a state where the Doppler bins of the Doppler bin number (Nd=256) are viewed for each Nd/P. Accordingly, phase-shift keying is executed to generate peaks. In FIG. 3, the hatched bins correspond to the assigned code "1", and the shaded blocks correspond to the assigned code "0".

Figure 4:
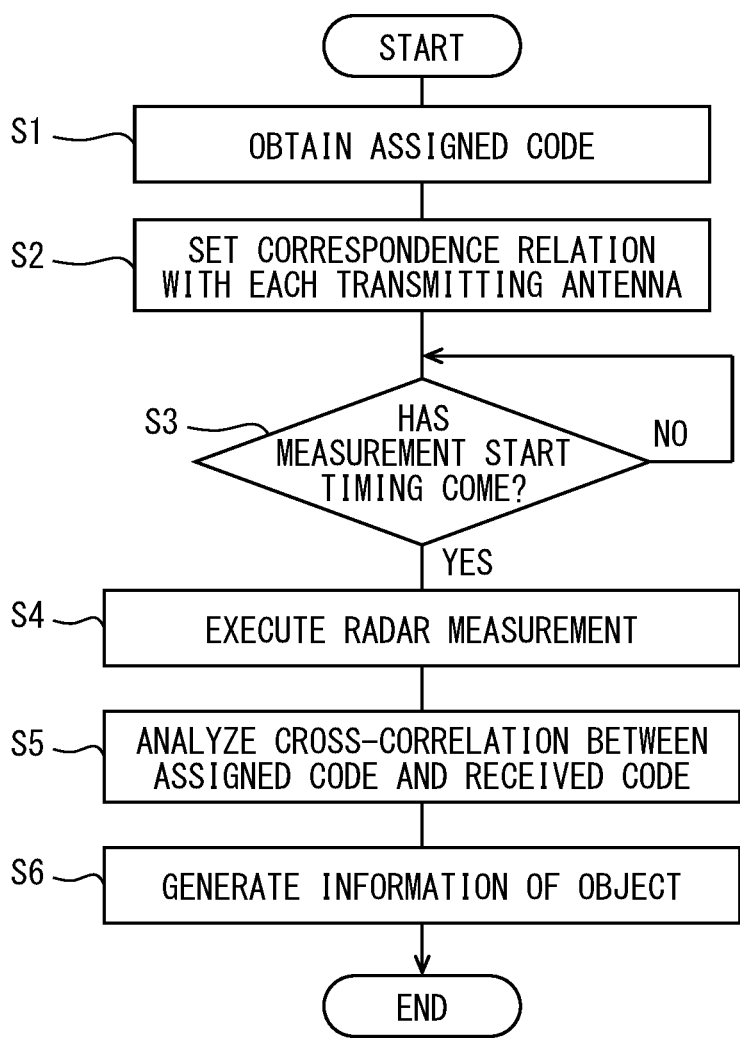
FIG. 4 illustrates the flow of object detection processing.

The processor 6 of the radar device 1 repeatedly executes an object detection process shown in FIG. 4. The processor 6 firstly acquires the assigned code (in S1). According to the present embodiment, the assigned code is preliminarily set and stored in the database 64. Therefore, the processor 6 reads the assigned code from the database 64 in S1.

Subsequently, the processor 6 sets the correspondence relation with each transmitting antenna 3a so that a peak associated with each transmission signal occurs in the bin corresponding to the assigned code "1" (in S2). For example, the processor 6 sets the amount of phase rotation for each of the transmission signals at the time of phase-shift keying that associates with a corresponding one of the transmitting antennas 3a, such that: the transmitting antenna 3a1 corresponds to the bin "0"; the transmitting antenna 3a2 corresponds to the bin "128"; the transmitting antenna 3a3 corresponds to the bin "192"; and the transmitting antenna 3a4 corresponds to the bin "255". It is noted that the processor 6 may preliminarily set the correspondence relation with the transmitting antennas 3a and store as the database 64.

The processor 6 determines whether or not a predetermined measurement start timing has come (in S3), and the processor 6 is in an idle state based on a condition that the measurement start timing has not come (in other words, S3: NO). On the other hand, in a case where the processor 6 determines that the measurement start timing has come (in other words, S3: YES), the processor 6 executes radar measurement (in S4). In S4, the processor 6 operates the transmitter 2 for a predetermined measurement period according to the set conditions to output radiation waves from the respective transmitting antennas 3a, and the receiver 5 receives reflected waves from the object.

In this case, if the assigned code is "10001011", the cyclically shifted code caused by the generation of folded noise is "11000101" and their minimum Hamming distance is 3. In the present embodiment, the modulator 22 executes phase-shift keying such that the minimum Hamming distance between the assigned code and a code group having a cyclic code acquired by cyclically shifting the assigned code is 3 or more. A code group having a cyclic shift corresponds to a collection of one or more expected values of an actually received code.

Subsequently, the processor 6 analyzes the mutual correlation between the assigned code and the received code (in S5). This received code can be acquired by, for example, two-dimensional Fourier transform (2DFFT) of the actually received signal and peak detection (CFAR). The processor 6 estimates under which circumstance the received code was obtained from the relationship between the known assigned code and the received code that is the actually obtained measurement result. In other words, the processor 6 verifies the reliability of separation.

For example, if the assigned code is "10001011" and the received code is "11001111", the received code matches the result of the OR operation of the assigned code and a code acquired by cyclically shifting the assigned code. Therefore, the receiver 5 can estimate that there are two objects, and can estimate that a folded noise occurs at one of two objects. The processor 6 can verify the accuracy of the estimation by analyzing whether or not the same received code can be acquired by another combination. That is, the processor 6 can separate each transmission signal when multiple objects are present.

Then, the processor 6 generates information such as the distance and speed or velocity of the object based on the analysis result (in S6). The generated information is output to an electronic control unit for display control and speed control adapted to the vehicle, and is used for, for example, notification to the driver and control of the speed of the vehicle. The calculation of cross-correlation in S5 and the generation of information in S6 will be described in detail in other embodiments. The radar device 1 executes phase-shift keying according to the linear cyclic block code as the assigned code in the modulator 22.

According to the radar device 1 described above, the following effects can be achieved. The radar device 1 includes the transmitting antenna unit 3, the oscillator 21, the modulator 22, the receiving antenna unit 4, the receiver 5, and the processor 6. The transmitting antenna unit 3 includes multiple transmitting antennas 3a. The oscillator 21 generates a continuous wave common signal. The modulator 22 generates multiple transmission signals sent to the multiple transmitting antennas 3a by the phase-shift keying. The phase-shift keying rotates a phase with different amount of phase rotation for each of multiple diverged signals acquired by diverging the common signal into the number identical to the number of the transmitting antennas 3a. The receiving antenna unit 4 includes at least one receiving antenna 4a. The receiver 5 generates a received code acquired by encoding the peak appearance pattern on the Doppler frequency axis for at least one reception signal received by the receiving antenna unit 4. The processor 6 generates information related to the object reflecting the wave emitted from the transmitting antenna unit 3, based on the received code generated by the reception unit 5.

In the radar device 1, if the code acquired by encoding the peak appearance pattern on the Doppler frequency axis in a case where the object is estimated to be stationary is adopted as the assigned code, the processor 6 sets the correspondence relation with the transmitting antennas 3a, such that the peaks associated with the transmissions signals are generated in the bins corresponding to the assigned code "1". The modulator 22 executes the phase-shift keying according to the linear cyclic block code as the assigned code.

Linear cyclic block codes have the property of cyclicity such that a cyclic shift of a codeword also results in a codeword. Therefore, by selecting one having a relatively large Hamming distance, the overlapping of peaks on the Doppler frequency axis can be reduced. In other words, it is easier to separate the transmission signals.

As a result, if the transmission signals can be separated, the speed or velocity of each object can be accurately estimated. Additionally, it is possible to lower the number of overlapping peaks through the assigned code with a large Hamming distance between codes to reduce the error in the angle measurement. In other words, the information of the object can be accurately obtained. Also, the required code length of the assigned code, that is, the number of phases (in other words, P) at the time of executing phase-shift keying is approximately twice the number (in other words, M) of the transmitting antennas 3a. Accordingly, the implementation is simpler, and the information of the object can be attained accurately even though multiple objects are present.

In the radar device 1, the modulator 22 executes phase-shift keying such that the minimum Hamming distance between an assigned code and a code group having cyclic codes acquired by cyclically shifting the assigned code is 2 or more. As a result, it is possible to reduce the overlapping of peaks and facilitate separation of the transmission signals. Therefore, the reliability of the separated result can be improved.

The modulator 22 executes the phase-shift keying so that the minimum Hamming distance between the assigned code and the code group having cyclic codes acquired by cyclically shifting the assigned code is 3 or more. With such a structure, it is possible to further reduce overlapping of peaks, facilitate separation of the respective transmission signals, and improve the reliability of the separated result.

Second Embodiment

Next, a second embodiment will be described. In the second embodiment, another technique for setting or selecting assigned codes will be described. The second embodiment may also be combined with one or more embodiments as long as they are not in conflict.

The radar device 1 can execute phase-shift keying in which the code polynomial of the assigned code is a polynomial divisible by a polynomial having a length greater than or equal to the code length of the code polynomial in the modulator 22.

Further, the radar device 1 executes the phase-shift keying for a code group acquired by cyclically shifting assigned codes in the modulator 22, such that C is smaller than D. C denotes the maximum number of overlapping bits and D denotes the minimum Hamming distance.

In the following, K denotes the number of overlapping objects, and Q is an integer larger than or equal to K. The radar device 1 can execute the phase-shift keying in the modulator 22 in which the results of the OR operation of the assigned codes and Q arbitrary codes in a code group acquired by cyclically shifting the assigned codes are different codes.

Assigned codes for executing such phase-shift keying include, for example, the Hamming code, Cyclic Redundancy Check (CRC) code, Bose-Chaudhuri-Hocquenghem (BCH) code, Reed-Solomon code, cyclic Golay code, and M-sequence code described in the first embodiment. A method of obtaining the assigned code for each code will be described below. The method of obtaining the code will be exemplified below using the code polynomial of a variable x. In the following equations, the term "=" indicates that the code polynomial of the assigned code is divisible by a polynomial having a length equal to or greater than the code length of the code polynomial.

Example of Hamming Code

In case of assigned code "01011001", code polynomial: $x^5+x^3+x^2=x^2\times(x^3+x+1)$ A 7-bit codeword, for example, "0101100" is obtained from the above code polynomial, bit expansion is executed by adding "1" to the end of the obtained codeword, and the assigned code "01011001" is obtained. In this case, bit expansion may be realized by adding one bit of "1" or "0" to the end of the codeword, adding one bit to the beginning of the codeword, or inserting one bit between bits of the codeword.

However, as with other techniques, the bit expansion is adopted for facilitating the calculation in the processor 6 and is not required. For example, it can be obtained as follows.

In case of assigned code "10001011", code polynomial: $x^6+x^2+1=x^3\times(x^3+x+1)$ For example, a codeword of "1000101" is obtained from the above code polynomial, bit expansion is executed by adding "1" to the end of the obtained codeword, and an assigned code "10001011" is obtained.

Example of CRC Code

Code polynomial: $x^{15}+x^{12}+x^7+x^6+x^5+x^4+x+1 =$ $$(x^7+x^2)\times(x^8+x^7+x^6+x^4+x^2+x+1)$$

Assigned code "1001000010111011" is obtained from the codeword acquired by the above code polynomial.

Example of BCH Code

Code polynomial: $x^{14}+x^{13}+x^{12}+x^7+x^6+x^5+x^2+x =$ $$(x^4+x^3+x^2)\times(x^{10}+x^8+x^5+x^4+x^2+x+1)$$

A codeword of, for example, "111000010100110" is obtained from the above code polynomial, bit expansion is executed by adding "1" to the end of the obtained codeword, and an assigned code="1110000101001101" is obtained.

Example of Reed-Solomon Code

Code polynomial: $x^3+x+1$

Using the above code polynomial, for example, a codeword of "00001000001101001001" is obtained, bit expansion is performed by adding "1" to the end of the obtained codeword, and the assigned code "000010000011010001001" is obtained.

Example of Cyclic Golay Code

Code polynomial: $x^{11}+x^{10}+x^6+x^5+x^4+x^2+1$

Using the above code polynomial, for example, a codeword "01110111010101111111010" is obtained, and "1" is added to the end of the obtained codeword. Then, the assigned code "011101110101011111110101" is obtained.

Example of M-Sequence Code

Code polynomial: $x^3+x+1$

Using the above code polynomial, for example, a codeword "1110100" is obtained, bit expansion is executed by adding "1" to the end of the obtained codeword, and then the assigned code "11101001" is obtained.

By setting an assigned code from such a codeword and executing the phase-shift keying in the modulator 22 using the assigned code, implementation becomes simpler and multiple objects can be detected in the same manner as in the first embodiment. In addition, it is possible to accurately obtain the information of objects even though multiple objects are present.

Third Embodiment

Next, a third embodiment will be described. In the third embodiment, a method for analyzing the cross-correlation between the assigned code and the received code in S5 of FIG. 4 described in the first embodiment will be described. In addition, the identical reference numerals are given to parts that are common to those described in other embodiments, and detailed description thereof will be omitted. The third embodiment may also be combined with one or more embodiments as long as they are not in conflict.

Figure 5:
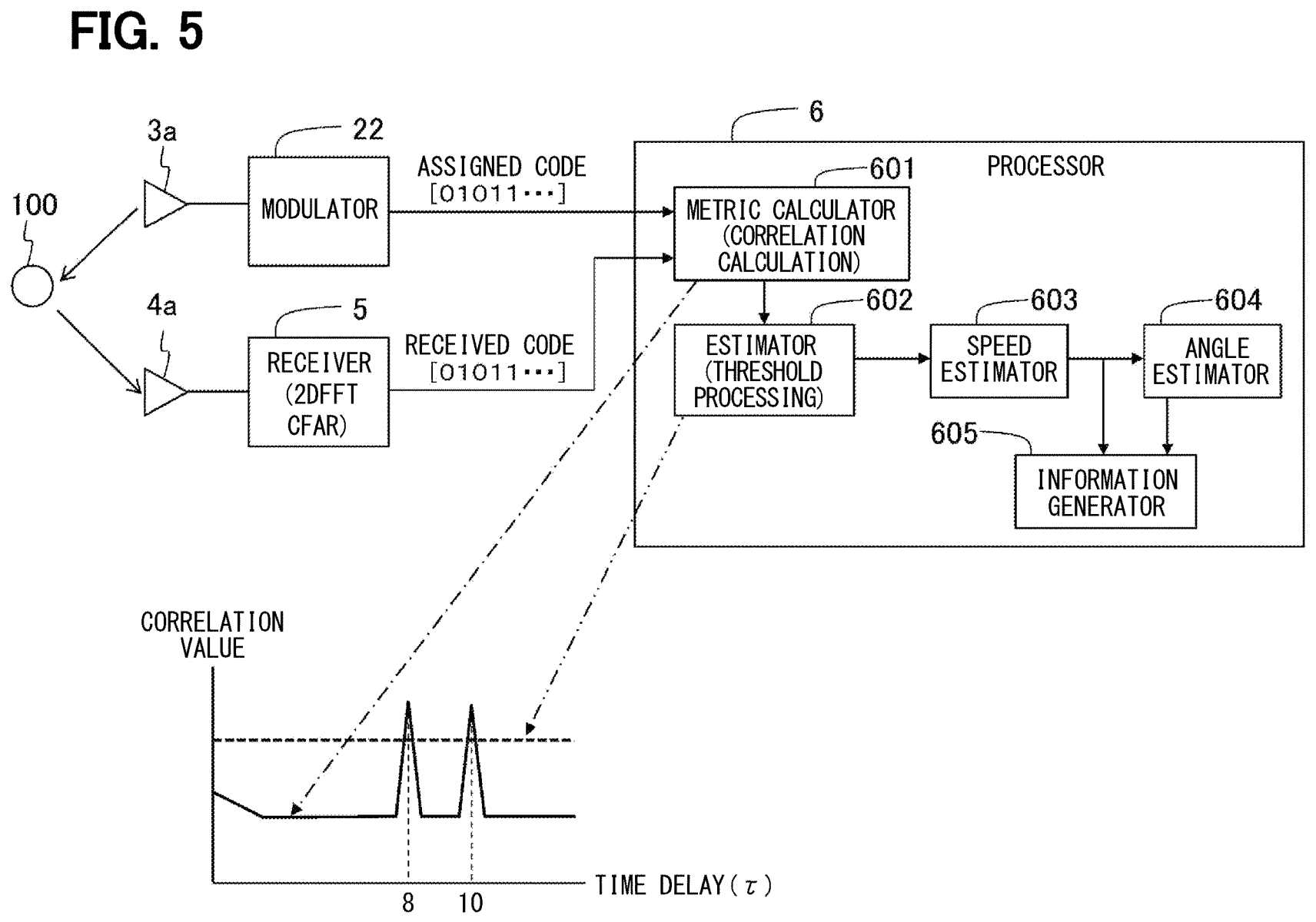

FIG. 5 illustrates an example of the configuration of a calculation block. As shown in FIG. 5, the processor 6 of the radar device 1 according to the present embodiment includes a metric calculator 601 that obtains the cross-correlation function between the assigned code and the received code. In the present embodiment, the metric calculator 601 calculates the correlation value between the assigned code and the received code as an example of the calculation result, and the relationship between the time delay (τ) indicates how many bits the assigned code are shifted. Although FIG. 5 illustrates that the processor 6 receives an input of the assigned code adopted in the phase-shift keying in the modulator 22, the assigned code is known in the processor 6 since the assigned code is a parameter set in the modulation 22 from the processor 6.

At this time, the metric calculator 601 calculates a cross-correlation function between the assigned code and the received code based on the Hamming distance. For example, if the operation result of the OR operation of the assigned code and the code acquired by shifting the assigned code by 1 bit is referred to as the operation code, the metric calculator 601 determines that the correlation value is higher if the Hamming distance between the received code and the operation code is smaller, and determines that the correlation value is lower if the Hamming distance between the received code and the operation code is larger. FIG. 5 illustrates that the assigned code and the received code have a high correlation value when τ=8, that is, an 8-bit shift state, and τ=10, that is, a 10-bit shift state.

The calculation result of the metric calculator 601 is output to an estimator 602. The estimator 602 extracts a peak with a high correlation value through threshold processing for extracting high cross-correlation with a threshold value. Therefore, it is possible to obtain the delay time with respect to the received code, in other words, the shift amount of the assigned code. The shift amount of the assigned code corresponds to the actual received code.

Then, if each transmission signal can be separated, for example, a speed estimator 603 can estimate the speed of an object such as the target object 100, and an angle estimator 604 can estimate the angle of each object. Information such as the distance, velocity or angle of each object can be generated in an information generator 605.

Thus, the radar device 1 according to the present embodiment includes the metric calculator 601 that obtains the cross-correlation between the assigned code and the received code. This allows each transmission signal to be separated based on cross-correlation when multiple peaks overlap. Accordingly, the implementation is simpler, and the information of the object can be attained accurately even though multiple objects are present. In addition, it is also possible to attain the effects identical to the one in the first or other embodiments.

Fourth Embodiment

Next, a fourth embodiment will be described. In the fourth embodiment, a method for analyzing the cross-correlation between the assigned code and the received code in S5 of FIG. 4 described in the first embodiment will be described. In addition, the identical reference numerals are given to parts that are common to those described in other embodiments, and detailed description thereof will be omitted. The fourth embodiment may also be combined with one or more embodiments as long as they are not in conflict.

Figures 6A, 6B:
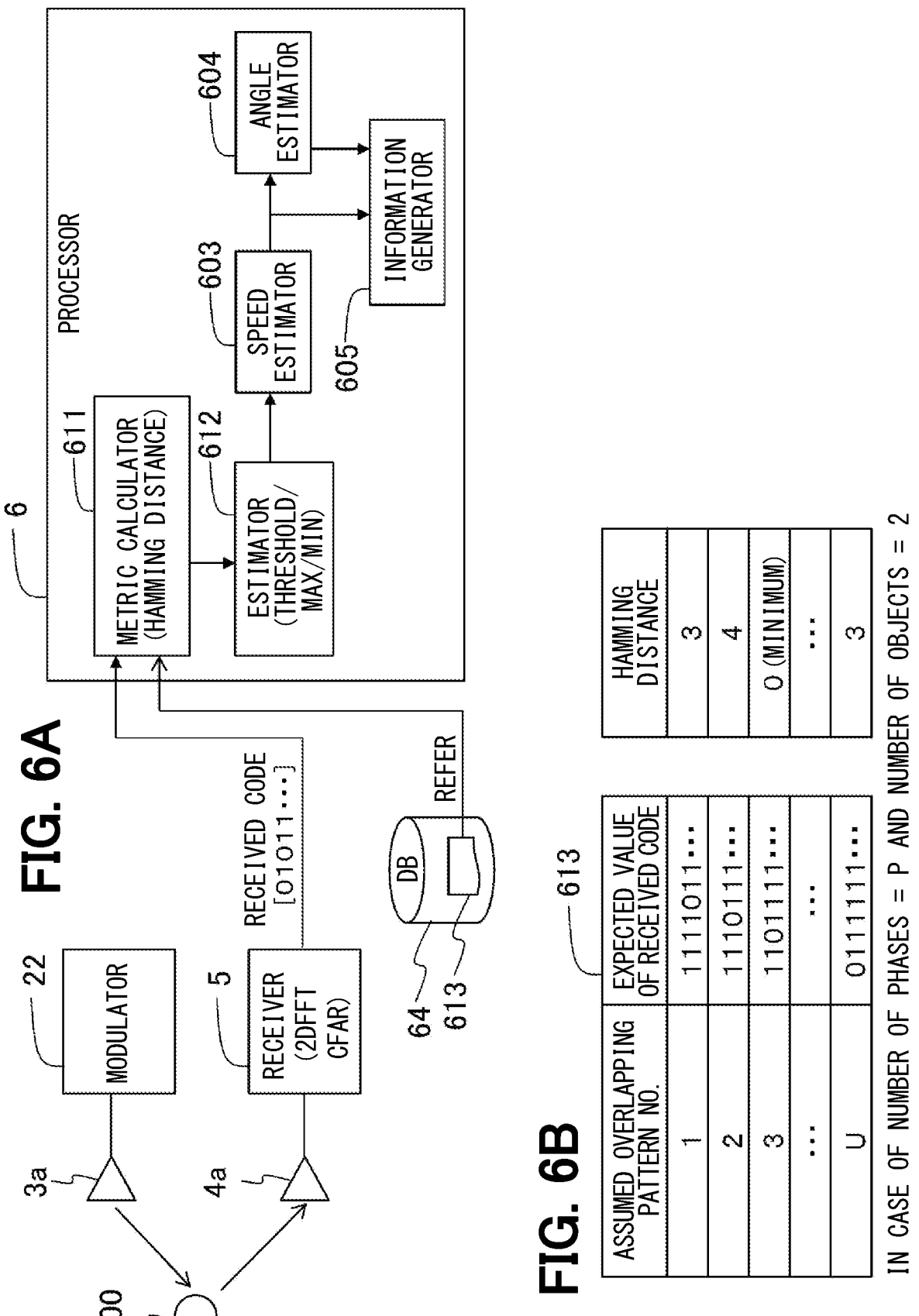
FIG. 6A illustrates the configuration of a processor according to a fourth embodiment.
FIG. 6B illustrates the flow of calculation according to the fourth embodiment.

FIG. 6A illustrates an example of the configuration of a calculation block. As shown in FIG. 6A, the processor 6 of the radar device 1 according to the present embodiment includes a metric calculator 611 that obtains the cross-correlation between the assigned code and the received code. The metric calculator 611 compares the received code with overlapping pattern data 613, and then obtains the difference between the received code and the overlapping pattern data 613 through the Hamming distance. The overlapping pattern data 613 stores all or a part of the expected values of the received codes in a case where multiple objects are present.

The overlapping pattern data 613 is a list of all or a part of the received codes expected in a case where P denotes the number of phases and the number of overlapping objects is 2, and is preliminarily stored in the database 64. The overlapping pattern data 613 is referred at a time of calculating the cross-correlation between the assigned code and the received code in the metric calculator 611. FIG. 6B illustrates an example of the overlapping pattern data 613. It is also possible to store other overlapping pattern data 613 with different expected numbers of overlapping objects. In other words, the overlapping pattern data 613 is data in which all or a part of the expected received codes are preliminarily listed for the assumed overlapping of all or part of the objects.

Since the assigned codes are preliminarily set, so if the number of overlapping objects is assumed, the expected value of the actually obtained received codes can be grasped in advance. That is, the overlapping pattern data 613 is correlated with the assigned code. If the expected values of received codes are listed and stored as the overlapping pattern data 613, the cross-correlation between the received code obtained during actual measurement and the assigned code can be acquired by referring to the overlapping pattern data 613.

For example, as shown in FIG. 6B, the Hamming distance between the overlapping pattern No. 1 and the received code is 3; the Hamming distance between the overlapping pattern No. 2 and the received code is 4; the Hamming distance between the overlapping pattern No. 3 and the received code is 0; and the Hamming distance between the overlapping pattern No. U and the received code is 3. With regard to the cross-correlation between the received code and the assigned code, the overlapping pattern No. 3 corresponds to the highest correlation value; the correlation value of each of the overlapping patterns No. 1 and No. U is relatively low; and the correlation value of the overlapping pattern No. 2 has the lowest correlation value. FIG. 6B illustrates an example of the calculated result of the Hamming distance.

The calculation result of the metric calculator 611 is output to an estimator 612. The estimator 612 executes the threshold processing for extracting high cross-correlation adopting a threshold value for the calculation result or executes processing obtaining the maximum value or the minimum value for the calculation result, in order to detect a peak in the cross-correlation between the expected value of the received code and the received code. Although the minimum value of the Hamming distance is obtained in the present embodiment, for example, the maximum value of the Hamming distance may be obtained according to the generation method of the overlapping pattern data 613. It is also possible to combine the threshold processing and the processing (may also be referred to as optimum processing) for obtaining the minimum or maximum value.

The estimator 612 estimates the overlapping pattern corresponding to the received signal in the overlapping pattern data 613 based on the peak in the detected cross-correlation. For example, in FIG. 6B, in a case where the overlapping pattern No. 3 is detected as the peak, the estimator 612 specifies the overlapping pattern No. 3 as the overlapping pattern corresponding to the received signal. Since the overlapping pattern is a code obtained in advance by assuming the presence of the object, if the overlapping pattern is known, it is possible to estimate the object corresponding to the overlapping pattern. That is, it is possible to reproduce a situation in which each transmission signal is substantially separated.

Then, if each transmission signal can be separated, for example, the speed estimator 603 can estimate the speed of each object, and the angle estimator 604 can estimate the angle of each object. Information such as the distance, velocity or angle of each object can be generated in the information generator 605.

Thus, the radar device 1 according to the present embodiment includes the metric calculator 611 that obtains the cross-correlation between the expected value of the received code and the received code. The metric calculator 611 obtains the difference between the received code and overlapping pattern data 613 as the Hamming distance. The overlapping pattern data 613 stores all or a part of the expected values of the received codes in a case where multiple objects exist. As a result, it is possible to firstly estimate the overlapping pattern having higher cross-correlation with the received code.

Since the overlapping pattern data 613 is the expected value of the received signal assumed according to the situation of the object, if the overlapping pattern having higher cross-correlation can be estimated, the situation of the object can be estimated from the overlapping pattern. That is, it is possible to estimate the situation of an assumed object from the actual received signal. As a result, the cross-correlation between the assigned code and the received code can be obtained, and the situation in which each transmission signal is substantially separated can be reproduced.

Accordingly, the implementation of the radar device 1 is simpler, and the information of objects can be attained correctly even though multiple objects are present. In addition, it is also possible to attain the effects identical to the one in the first or other embodiments. In this situation, for the received signal not included in the overlapping pattern data 613, it is possible to obtain the overlapping pattern through the calculation of the cross-correlation in combination with, for example, the third embodiment.

Fifth Embodiment

Next, a fifth embodiment will be described. In the fifth embodiment, a method for analyzing the cross-correlation between the assigned code and the received code in S5 of FIG. 4 described in the first embodiment will be described. In addition, the identical reference numerals are given to parts that are common to those described in other embodiments, and detailed description thereof will be omitted. The fifth embodiment may also be combined with one or more embodiments as long as they are not in conflict.

Figures 7A, 7B:
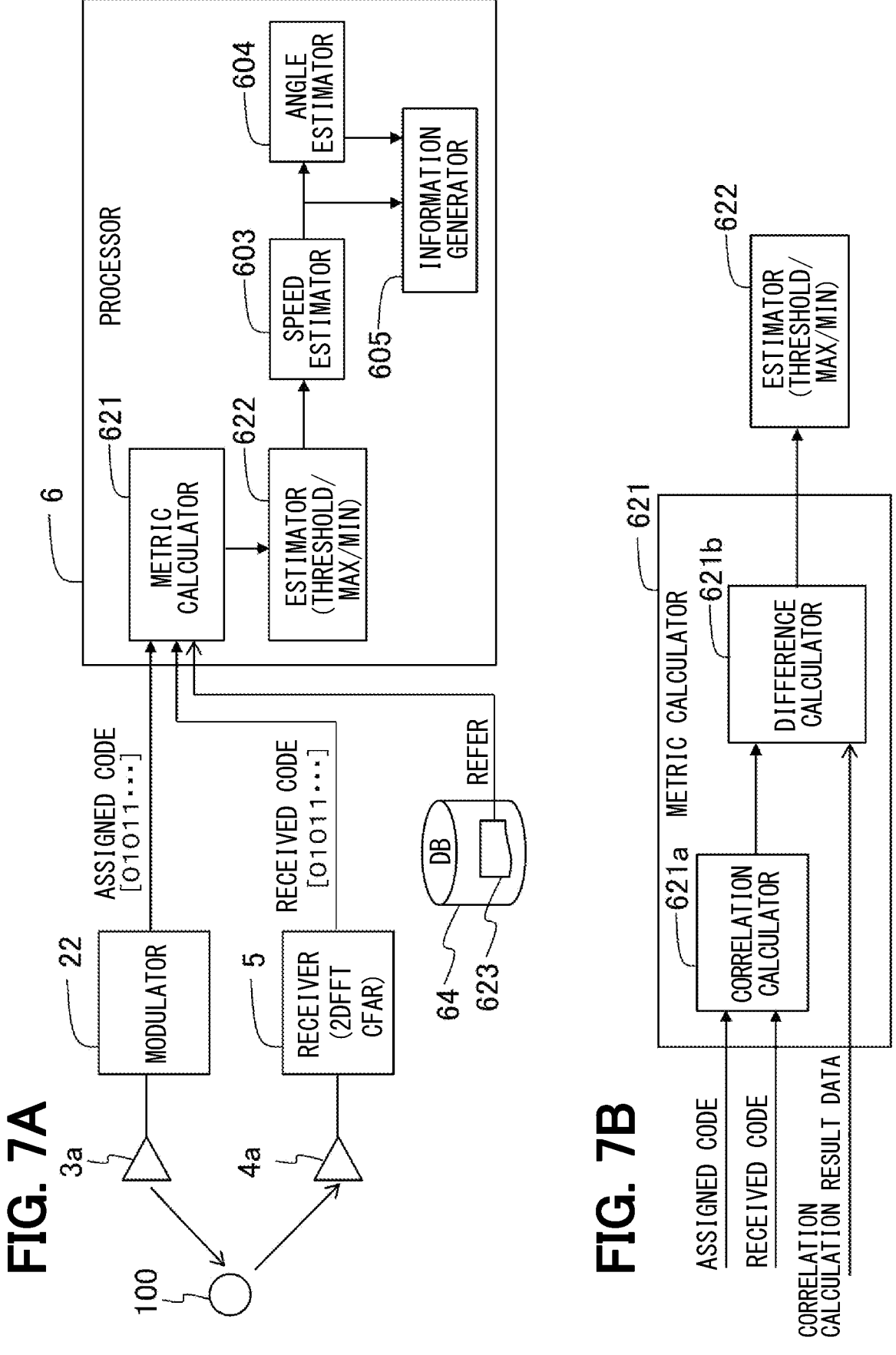
FIG. 7A illustrates the configuration of a processor according to a fifth embodiment.
FIG. 7B illustrates the flow of calculation according to the fifth embodiment.

FIG. 7A illustrates an example of the configuration of a calculation block. As shown in FIG. 7A, the processor 6 of the radar device 1 according to the present embodiment includes a metric calculator 621 that obtains the cross-correlation between the assigned code and the received code. As shown in the calculation block, the metric calculator 621 includes a correlation calculator 621*a* that calculates the cross-correlation between, for example, the assigned code and the received code, and a difference calculator 621*b* for calculating the difference with respect to the calculated result of the correlation calculator 621*a* with reference to correlation-calculation result data 623.

As similar to the metric calculator 601 according to the first embodiment, the correlation calculator 621*a* obtains the cross-correlation between the assigned code and the received code as the relationship between the correlation value and the delay time indicated as the calculation result in FIG. 5. Further, the difference calculator 621*b* compares the calculation result of the correlation calculator 621*a* with the correlation-calculation result data 623 preliminarily stored in, for example, the database 64 to calculate the difference with respect to the correlation-calculation result data 623.

The correlation-calculation result data 623 is data acquired by preliminarily calculating all or a part of the calculation results of the cross-correlation between the expected value of the received code and the assigned code assumed in a case where multiple objects are present. The correlation-calculation result data 623 stores data indicating cross-correlation such as the relationship between the correlation value and the delay time shown in the calculation result of FIG. 5 as an example. The correlation-calculation result data 623 is stored as data that can be compared with the calculation result of the correlation calculator 621*a*. The correlation-calculation result data 623 is data acquired by preliminarily calculating all or a part of the calculation result of the cross-correlation between the expected value of the received code and the assigned code with respect to the assumed overlapping state of all or part of the objects.

In such a configuration, when radar measurement is executed, as illustrated in FIG. 7B, the correlation calculator 621*a* firstly calculates the cross-correlation function between the assigned code and the received code, and outputs the calculation result to the difference calculator 621*b*. Subsequently, in the difference calculator 621*b*, the calculation result of the correlation calculator 621*a* and the correlation-calculation result data are compared, and the difference between the calculation result and the correlation-calculation result data is calculated.

The calculation result of the difference calculator 621*b* is output to the estimator 622, and the estimator 622 executes the threshold processing for extracting high cross-correlation adopting a threshold value for the difference or executes processing obtaining the maximum value or the minimum value for the difference, in order to detect a peak in the cross-correlation between the assigned code and the received code.

The correlation-calculation result data 623 indicates the cross-correlation between the expected value of the received signal and the assigned signal in a certain situation that can estimates the situation of the object corresponding to the actual received signal. Based on the correlation-calculation result data 623, it is possible to reproduce the situation in which each transmission signal is substantially separated.

Then, if each transmission signal can be separated, for example, the speed estimator 603 can estimate the speed of each object, and the angle estimator 604 can estimate the angle of each object. Information such as the distance, velocity or angle of each object can be generated in the information generator 605.

Thus, the radar device 1 according to the present embodiment includes the metric calculator 621 that obtains the cross-correlation between the assigned code and the received code. Then, the metric calculator 621 compares the calculation result of the cross-correlation between the assigned code and the received code with the correlation-calculation result data 623, and calculates the difference between the calculation result and the correlation-calculation result data 623. The correlation-calculation result data 623 preliminarily stores all or a part of the cross-correlation between the received code and the assigned code. The received code is assumed in a case where multiple objects exist. The assigned code is obtained from the received signal. Therefore, it is possible to estimate the situation of the object corresponding to the received code, and it is possible to reproduce the situation in which each communication signal is substantially separated.

Accordingly, the implementation of the radar device 1 is simple, and the information of objects can be attained accurately even though multiple objects are present. In addition, it is also possible to attain the effects identical to the one in the first or other embodiments. With regard to the received signal not included in the correlation-calculation result data 623, the overlapping pattern is estimated with the calculation of the cross-correlation in combination with, for example, the third embodiment, and the estimation is executed based on the overlapping pattern data 613 in combination with the fourth embodiment.

Sixth Embodiment

A sixth embodiment will be described. In the sixth embodiment, a method for analyzing the cross-correlation between the assigned code and the received code in S5 of FIG. 4 described in the first embodiment will be described. In addition, the identical reference numerals are given to parts that are common to those described in other embodiments, and detailed description thereof will be omitted. The sixth embodiment may also be combined with one or more embodiments as long as they are not in conflict.

Figures 8A, 8B:
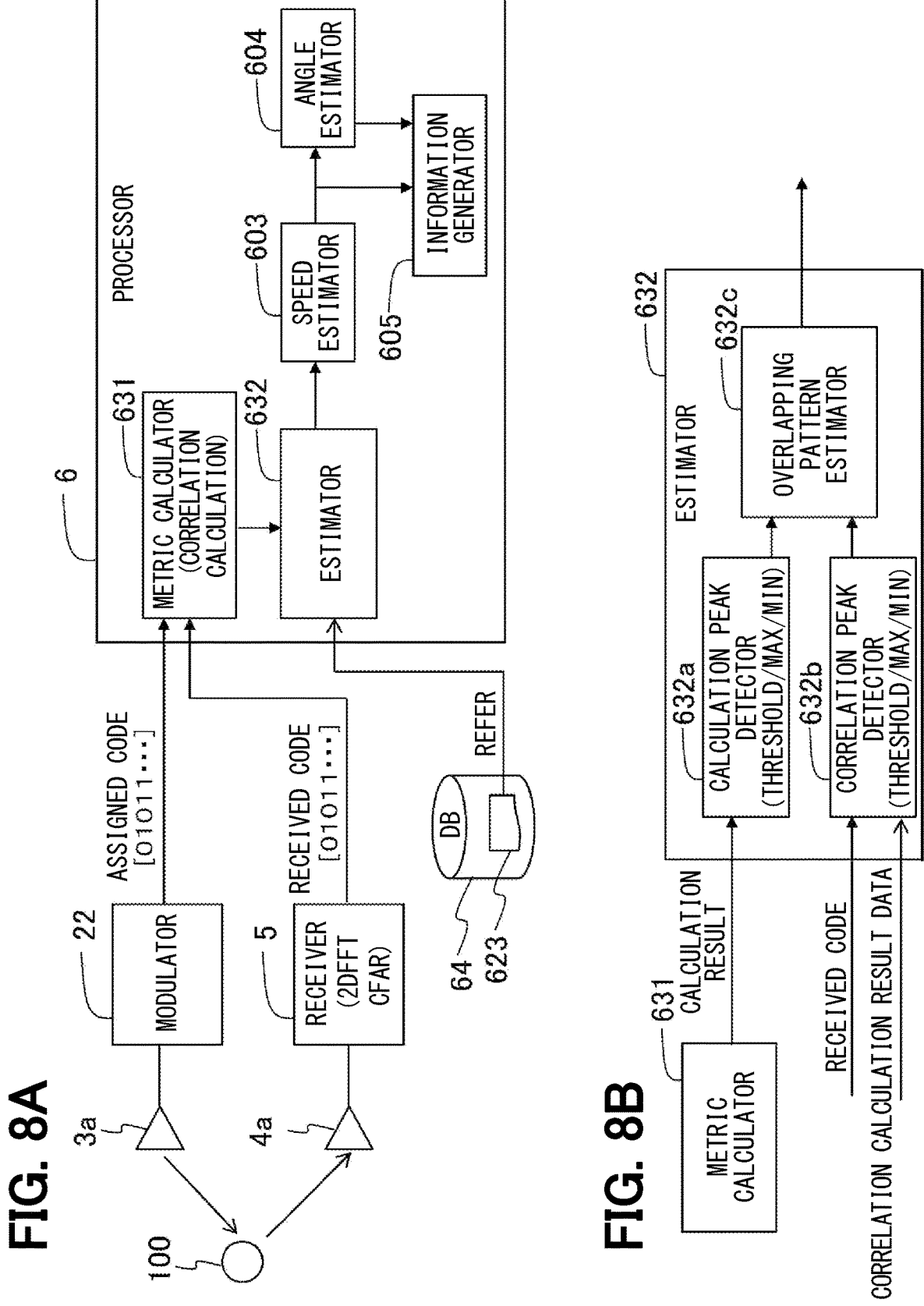
FIG. 8A illustrates the configuration of a processor according to a sixth embodiment.
FIG. 8B illustrates the flow of calculation according to the sixth embodiment.

FIG. 8A illustrates an example of the configuration of a calculation block. As shown in FIG. 8A, the processor 6 of the radar device 1 according to the present embodiment includes a metric calculator 631 and an estimator 632. The metric calculator 631 obtains the cross-correlation function between the assigned code and the received code. The estimator 632 detects the peak in the cross-correlation function between the assigned code and the received code.

As similar to the metric calculator 601 according to the first embodiment, the metric calculator 631 obtains the cross-correlation function between the assigned code and the received code as the relationship between the correlation value and the delay time indicated as the calculation result in FIG. 5.

The estimator 632 is indicated as a calculation block includes a calculation peak detector 632*a*, a correlation peak detector 632*b*, and an overlapping pattern estimator 632*c*.

The calculation peak detector 632a detects the peak of the calculation result of the metric calculator 631. The correlation peak detector 632b compares the received code with the correlation-calculation result data 623 to detect the peak in the cross-correlation. The overlapping pattern estimator 632c estimates the overlapping state of the peak based on the output of each of the calculation peak detector 632a and the correlation peak detector 632b.

As illustrated in FIG. 8B, the calculation peak detector 632a executes the threshold processing for extracting high cross-correlation adopting a threshold value for the calculation result of the metric calculator 631 or executes processing obtaining the maximum value or the minimum value for the calculation result of the metric calculator 631, in order to detect a peak in the cross-correlation between the assigned code and the received code.

The correlation peak detector 632b compares the received code with the correlation-calculation result data 623 and executes the threshold processing for extracting higher cross-correlation by adopting the threshold value or processing for obtaining the maximum value or the minimum value for the calculation result, in order to estimate the peak in the cross-correlation between the received code and the correlation-calculation result data 623, in other words, the data having a higher correlation value with the received signal included in the correlation-calculation result data 623. Since the received code is included in the cross-correlation calculation result as the output of the metric calculator 631, it is not necessary to input the received code to the correlation peak detector 632b in a case of using the information of the received code.

The overlapping pattern estimator 632c compares the peak detected by the calculation peak detector 632a with the peak detected by the correlation peak detector 632b, in order to estimate the overlapping state of the peaks corresponding to the overlapping situation of the actual objects. At this time, the overlapping pattern estimator 632c obtains, for example, the difference between both peaks as the Hamming distance, and determines that the peak detection result of each block is proper based on a condition that the Hamming distance is smaller and estimates the overlapping situation of the objects corresponding to the peaks. Therefore, it is possible to estimate the situation of the object corresponding to the received code, and it is possible to reproduce the situation in which each communication signal is substantially separated.

Then, the estimation result of the speed estimator 603 can estimate the speed of each object, and the angle estimator 604 can estimate the angle of each object. Information such as the distance, velocity or angle of each object can be generated in the information generator 605.

The radar device 1 according to the present embodiment includes a metric calculator 621 and an estimator 632. The metric calculator 621 obtains the cross-correlation between the assigned code and the received code. The estimator 632 detects the peak in the cross-correlation between the assigned code and the received code.

A first peak is detected by executing threshold processing for extracting a peak by adopting a threshold value for the calculation result of the metric calculator 631 or processing (may also be referred to as optimum processing) for obtaining the maximum value, the minimum value, or an extreme value for the calculation result of the metric calculator 631. A second peak is acquired by comparing the received signal with the correlation-calculation result data 623. The estimator 632 compares the first peak with the second peak to estimate the overlapping situation of the objects. Therefore, it is possible to reproduce a situation in which each transmission signal is substantially separated.

Accordingly, the implementation of the radar device 1 is simpler, and the information of objects can be attained accurately even though multiple objects are present. In addition, it is also possible to attain the effects identical to the one in the first or other embodiments. With regard to the received signal not included in the correlation-calculation result data 623, the overlapping pattern is estimated with the calculation of the cross-correlation in combination with, for example, the third embodiment, and the estimation is executed based on the overlapping pattern data 613 in combination with the fourth embodiment.

Seventh Embodiment

Next, a seventh embodiment will be described. In the seventh embodiment, a method for analyzing the cross-correlation between the assigned code and the received code in S5 of FIG. 4 described in the first embodiment will be described. In addition, the identical reference numerals are given to parts that are common to those described in other embodiments, and detailed description thereof will be omitted. The seventh embodiment may also be combined with one or more embodiments as long as they are not in conflict.

Figures 9A, 9B:
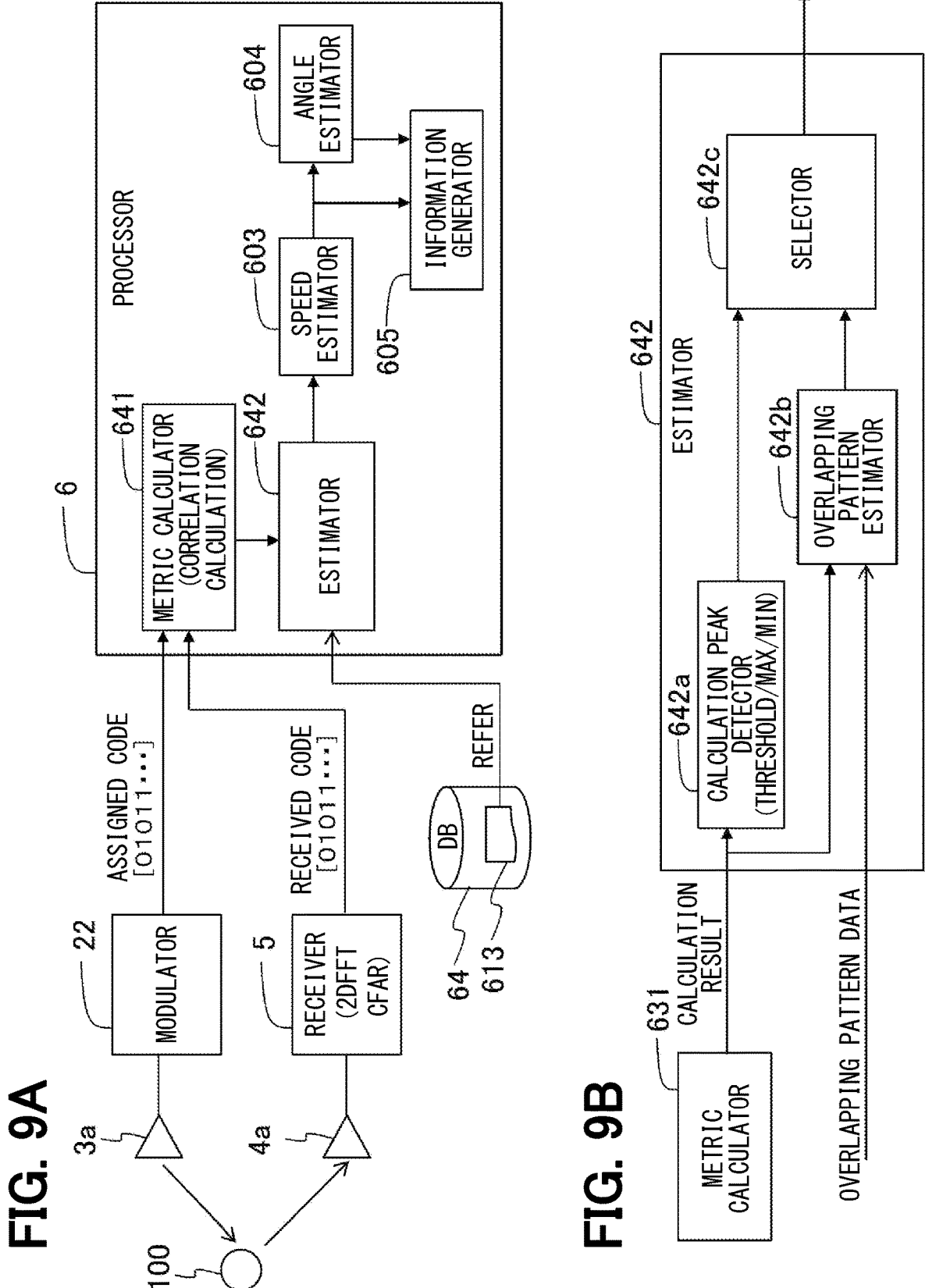
FIG. 9A illustrates the configuration of a processor according to a seventh embodiment.
FIG. 9B illustrates the flow of calculation according to the seventh embodiment.

As shown in, for example, a calculation block configuration in FIG. 9A, the processor 6 of the radar device 1 according to the present embodiment includes a metric calculator 641 and an estimator 642. The metric calculator 641 obtains the cross-correlation between the assigned code and the received code. The estimator 642 detects the peak in the cross-correlation between the assigned code and the received code.

As similar to the metric calculator 601 according to the first embodiment, the metric calculator 641 obtains the cross-correlation function between the assigned code and the received code as the relationship between the correlation value and the delay time indicated as the calculation result in FIG. 5.

As shown in FIG. 9B, the estimator 642 illustrated as the detail of the calculation block includes a calculation peak detector 642a, an overlapping pattern estimator 642b, and a selector 642c. The calculation peak detector 642a detects the peak of the calculation result of the metric calculator 641. The overlapping pattern estimator 642b estimates the overlapping situation of the peaks by comparing the calculation result of the metric calculator 641 with the overlapping pattern data 613. The selector 642c selects one of the detection result of the calculation peak detector 642a and the estimation result of the overlapping pattern estimator 642b, whichever has higher reliability of the correlation value with respect to the received signal.

The calculation peak detector 642a executes the threshold processing for extracting high cross-correlation adopting a threshold value for the calculation result of the metric calculator 641 or executes processing obtaining the maximum value or the minimum value for the calculation result of the metric calculator 641, in order to detect a peak in the cross-correlation between the assigned code and the received code.

The overlapping pattern estimator 642b compares the calculation result of the metric calculator 641 with the correlation-calculation result data 623, and estimates the peak in the cross-correlation between the calculation result and the correlation-calculation result data 623, in other words, the data having a higher correlation value with respect to the calculation result in the data included in the correlation-calculation result data 623.

The selector 642c selects one of the detection result of the calculation peak detector 642a and the estimation result of the overlapping pattern estimator 642b, whichever has a higher cross-correlation with respect to the received signal such as a relatively small Hamming distance. If both of the results are consistent, one of them can be selected. If both of the results are determined to be lower in certainty, the peak can be detected based on another method described in other embodiments.

In the present embodiment, the peaks corresponding to the overlapping situation of the objects is detected by multiple methods, and one of the peaks having higher reliability is selected. Since the overlapping pattern data 613 is the expected value of the received signal assumed according to the situation of the object, if an overlapping pattern with higher cross-correlation can be estimated, the situation of the object can be estimated from the overlapping pattern. That is, it is possible to estimate the situation of an assumed object from the actual received signal. As a result, the cross-correlation between the assigned code and the received code can be obtained, and the situation in which each transmission signal is substantially separated can be reproduced.

The radar device 1 according to the present embodiment includes a metric calculator 621 and an estimator 642. The metric calculator 621 obtains the cross-correlation between the assigned code and the received code. The estimator 642 detects the peak in the cross-correlation between the assigned code and the received code. The estimator 642 compares a first peak with a second peak to estimate the overlapping situation of the objects. The first peak is obtained from the calculation result of the metric calculator 641. The second peak is acquired by comparing the calculation result with the overlapping pattern data 613.

Therefore, it is possible to reproduce a situation in which each transmission signal is substantially separated. Accordingly, the implementation of the radar device 1 is simpler, and the information of objects can be attained accurately even though multiple objects are present. In addition, it is also possible to attain the effects identical to the one in the first or other embodiments. With regard to the received signal not included in the overlapping pattern data 613, the overlapping pattern is estimated with the calculation of the cross-correlation in combination with, for example, the third embodiment, and the estimation is executed based on the correlation-calculation result data 623 in combination with the fifth embodiment.

The control unit and the method according to the present disclosure may be achieved by a dedicated computer provided by constituting a processor and a memory programmed to execute one or more functions embodied by a computer program. Alternatively, the controllers described in the present disclosure and the methods thereof may be realized by a dedicated computer configured as a processor with one or more dedicated hardware logic circuits. Alternatively, the controller and methods described in the present disclosure may be realized by one or more dedicated computer, which is configured as a combination of a processor and a memory, which are programmed to perform one or more functions, and a processor which is configured with one or more hardware logic circuits. The computer program may also be stored on a computer readable and non-transitory tangible recording medium as instructions executed by a computer.

What is claimed is:

1. A radar device comprising:
   a transmitting antenna unit including a plurality of transmitting antennas;
   an oscillator configured to generate a common signal having a continuous wave;
   a modulator configured to generate a plurality of transmission signals respectively provided to the plurality of transmitting antennas by executing phase-shift keying, the phase-shift keying including
   diverging the common signal into a plurality of diverged signals, number of the plurality of diverged signals being equal to number of the plurality of transmitting antennas, and
   rotating respective phases of the plurality of diverged signals by different amounts of phase rotation;
   a receiving antenna unit including at least one receiving antenna;
   a receiver configured to
      acquire at least one received signal received by the receiving antenna unit,
      generate a received code by encoding an appearance pattern of a peak of the at least one received signal on a Doppler frequency axis; and
   a processor configured to generate information related to an object that reflects a wave radiated from the transmitting antenna unit, according to the received code generated by the receiver,
   wherein
   an assigned code is defined as a code acquired by encoding an appearance pattern of a peak that is expected to appear on the Doppler frequency axis when the object is stationary, and
   the modulator is further configured to execute the phase-shift keying using a linear block code as the assigned code.

2. The radar device according to claim 1, wherein the modulator is further configured to execute the phase-shift keying by using the assigned code having a minimum Hamming distance being two or larger with respect to a code group having a cyclic code acquired by cyclically shifting the assigned code.

3. The radar device according to claim 1, wherein the modulator is further configured to execute the phase-shift keying by using the assigned code having a minimum Hamming distance being three or larger with respect to a code group having a cyclic code acquired by cyclically shifting the assigned code to be three or larger.

4. The radar device according to claim 1, wherein the modulator is further configured to execute the phase-shift keying by using the assigned code having a code polynomial being divisible by a polynomial having a length larger than or equal to a code length of the code polynomial.

5. The radar device according to claim 1, wherein the modulator is further configured to execute the phase-shift keying by satisfying C<D, where:
   C denotes maximum number of overlapping bits in a code group having a cyclic code acquired by cyclically shifting the assigned code; and
   D denotes a shortest Hamming distance in the code group.

6. The radar device according to claim 1, wherein the modulator is further configured to execute the phase-shift keying by using one of a Hamming code, a cyclic redundancy check code, a Bose-Chaudhuri-Hocquenghem code, a cyclic Golay code, and a M-sequence code as the assigned code.

7. The radar device according to claim 1, wherein the modulator is further configured to execute a bit expansion in which a one-bit symbol being 0 or 1 is added to the assigned code so that the assigned code has a code length being in a power of two.

8. The radar device according to claim 1, wherein the modulator is further configured to execute the phase-shift keying by setting a code group having arbitrary cyclic codes acquired by cyclically shifting the assigned code, number of the arbitrary cyclic codes being larger than or equal to number of a plurality of objects overlapped each other, and generating a result of a logical sum operation of the assigned code and each of the arbitrary cyclic codes as a distinct code to be used as the assigned code.

9. The radar device according to claim 1, further comprising:

a metric calculator configured to acquire a function of cross-correlation between the assigned code and the received code.

10. The radar device according to claim 1, further comprising:

a metric calculator configured to compare the received code with overlapping pattern data to calculate a difference between the received code and the overlapping pattern data, wherein the overlapping pattern data preliminarily stores all or a part of expected values of the received code that are expected when a plurality of objects are present.

11. The radar device according to claim 9, wherein the metric calculator is further configured to compare a calculation result of the function of the cross-correlation between the assigned code and the received code with correlation-calculation result data to calculate a difference between the calculation result and the correlation-calculation result data, and the correlation-calculation result data preliminarily stores a part of all of calculation results of the cross-correlation between the received code expected when a plurality of objects are present and the assigned code by which the at least one received signal is acquired.

12. The radar device according to claim 10, wherein the metric calculator is further configured to calculate the difference between the received code and the overlapping pattern data based on a Hamming distance.

13. The radar device according to claim 9, further comprising:

an estimator configured to:

detect a first peak in a calculation result of the function of the cross-correlation between the assigned code and the received code through threshold processing or optimum processing, the threshold processing adopting a threshold value to extract the first peak from the calculation result, the optimum processing acquiring a maximum value, a minimum value or an extreme value of the calculation result to extract the first peak;

detect a second peak acquired by comparing the at least one received signal with correlation-calculation result data, the correlation-calculation result data preliminarily storing a part or all of calculation results of cross-correlation between the assigned code by which the at least one received signal is acquired and each of expected values of the received code that are expected when a plurality of objects are present; and compare the first peak with the second peak to estimate an overlapping state of the object.

14. The radar device according to claim 9, further comprising:

an estimator configured to:

detect a first peak in a calculation result of the function of the cross-correlation between the assigned code and the received code;

detect a second peak acquired by comparing the calculation result with overlapping pattern data, the overlapping pattern data preliminarily storing all or a part of expected values of the received code expected when a plurality of objects are present; and compare the first peak with the second peak to estimate an overlapping state of the object.

15. The radar device according to claim 1, wherein the modulator is further configured to execute the phase-shift keying by using one of a Hamming code, a cyclic redundancy check code, a Bose-Chaudhuri-Hocquenghem code, and a cyclic Golay code as the assigned code.

16. The radar device according to claim 1, wherein the assigned code is also used as an error correction code.

17. The radar device according to claim 1, wherein the assigned code is a binary code, and a number of bits set to "1" in the assigned code is equal to a number of the plurality of transmitting antennas.

18. The radar device according to claim 1, wherein the processor is further configured to:

set the assigned code for each of the plurality of transmitting antennas; and determine amount of phase rotation of a signal transmitted from each of the plurality of transmitting antennas according to the assigned code.

19. The radar device according to claim 1, wherein a number of the respective phases used in the phase-shift keying is equal to two times of a number of the plurality of transmitting antennas.

20. The radar device according to claim 1, wherein the processor is configured to:

execute analysis of cross-correlation relation between the assigned code that is output from the modulator and the received code that is output from the receiver; and generate information of the object based on a result of the analysis.

21. The radar device according to claim 1, wherein the processor is configured to:

execute separation of the plurality of transmitting signals by comparing (i) a result of an OR operation between the assigned code and a code group having cyclic codes acquired by cyclically shifting the assigned code, with (ii) the received code; and evaluate reliability of a result of the separation.

22. The radar device according to claim 20, wherein the processor includes a database that stores the assigned code, and the processor is configured to read out the assigned code from the database prior to the analysis of the cross-correlation relation.

23. The radar device according to claim 1, further comprising a metric calculator configured to compare the received code with overlapping pattern data to calculate a difference between the received code and the overlapping pattern data, wherein correlation-calculation result data is acquired by preliminarily calculating all or a part of a calculation result of cross-correlation between an expected value of the received code and the assigned code assumed in a case where multiple objects are present, and the processor is further configured to estimate a peak in a
  cross-correlation between the calculation result and the
  correlation-calculation result data.

* * * * *